United States Patent [19]

Yamazaki et al.

[11] Patent Number: 4,465,158

[45] Date of Patent: Aug. 14, 1984

[54] SAFETY DEVICE FOR VEHICLE SEAT WITH VIBRATOR

[75] Inventors: Shinichiro Yamazaki, Anjo; Takaki Manabe, Chiryu; Toranosuke Kato, Nagoya, all of Japan

[73] Assignees: Aisin Seiki Kabushiki Kaisha, Kariya; Toyota Jidosha Kogyo Kabushiki Kaisha, Toyota, both of Japan

[21] Appl. No.: 359,431

[22] Filed: Mar. 18, 1982

[30] Foreign Application Priority Data

Mar. 25, 1981 [JP] Japan .................................. 56-44557
Mar. 25, 1981 [JP] Japan .................................. 56-44558

[51] Int. Cl.$^3$ .......................... A47C 1/00; B60K 28/00
[52] U.S. Cl. ...................................... 180/271; 128/33; 180/273; 180/277; 297/284
[58] Field of Search ............... 180/271, 273, 277, 290, 180/287; 296/63; 297/284; 128/70, 33, 376, 41, 377

[56] References Cited

U.S. PATENT DOCUMENTS

| | | | |
|---|---|---|---|
| 4,051,915 | 10/1977 | Behrens | 180/271 |
| 4,136,685 | 1/1979 | Ramey | 128/33 |
| 4,148,522 | 4/1979 | Sakurada et al. | 297/284 |
| 4,162,807 | 7/1979 | Yoshimura | 297/284 |
| 4,228,793 | 10/1980 | Ramey | 128/33 |

*Primary Examiner*—Richard A. Bertsch
*Attorney, Agent, or Firm*—Oblon, Fisher, Spivak, McClelland & Maier

[57] ABSTRACT

A vehicle driver's seat is equipped with an electromagnetically operated vibrator arranged in its back-rest to be activated by energization of an electric control circuit for periodically supplying an electric current to the vibrator from a vehicle battery. A safety device for the driver's seat comprises a parking brake switch arranged between the electric control circuit and the battery to be opened during the inoperative condition of a parking brake of the vehicle and to be closed in response to operation of the parking brake, and an additional control circuit for energizing the electric control circuit in response to closing of the switch to activate the vibrator during arrest of the vehicle and for deenergizing the electric control circuit in response to opening of the switch to deactivate the vibrator during movement of the vehicle.

5 Claims, 4 Drawing Figures

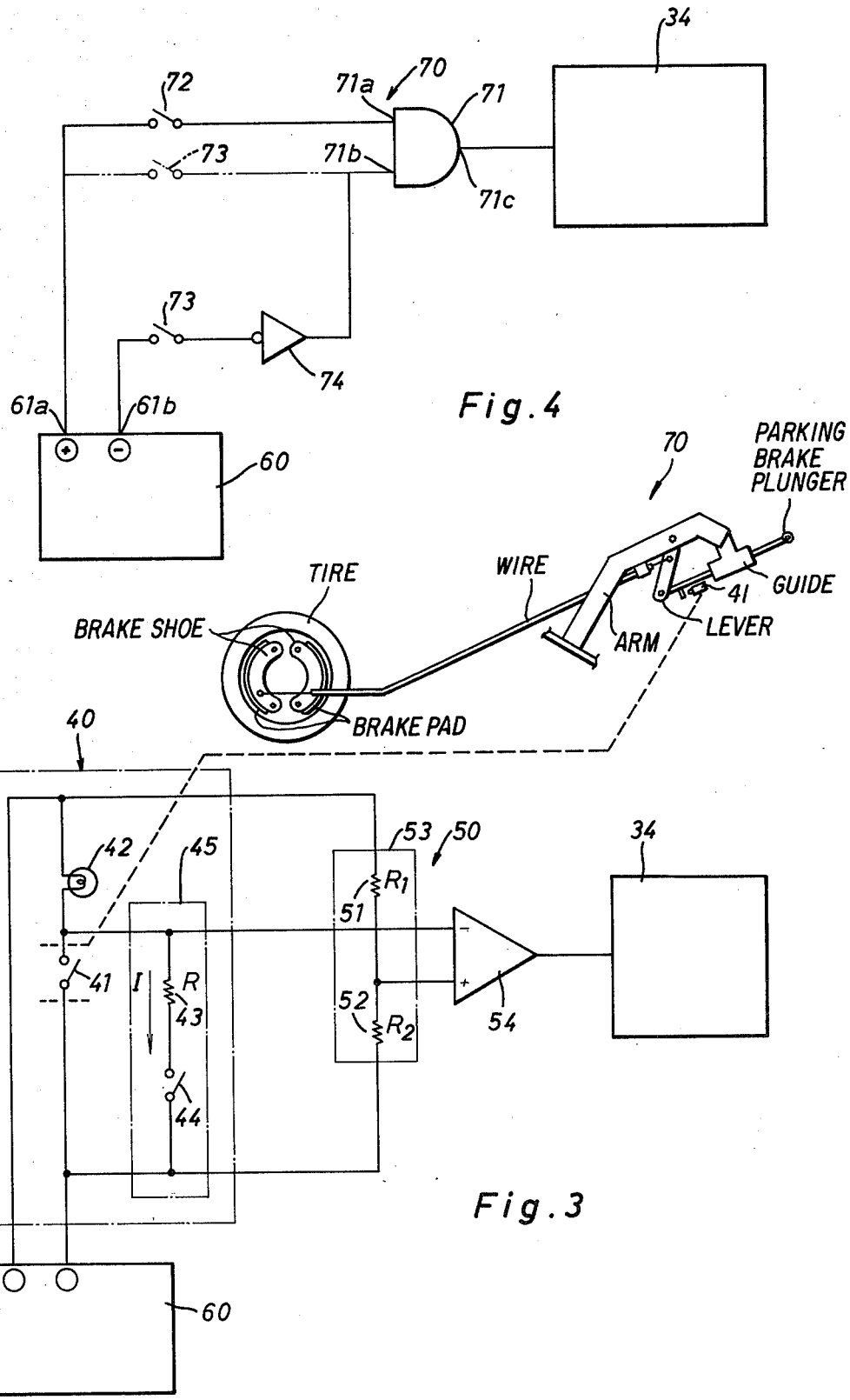

SAFETY DEVICE FOR VEHICLE SEAT WITH VIBRATOR

BACKGROUND OF THE INVENTION

The present invention relates to a vehicle seat equipped in its back-rest with an electromagnetically operated vibrator for eliminating fatigue of the operator's lumbar.

In use of such a vehicle driver's seat equipped in its back-rest with an electromagnetically operated vibrator, the operator will become drowsy during travel of the vehicle if he operates the vibrator. It is, therefore, required to deactivate the vibrator during travel of the vehicle to prevent a traffic accident caused by the operator falling asleep.

SUMMARY OF THE INVENTION

Accordingly, it is a primary object of the present invention to provide a safety device for such a vehicle seat as described above which is capable of activating the vibrator only when the vehicle is arrested and capable of deactivating the vibrator during travel of the vehicle to prevent the operator from falling asleep.

Another object of the present invention is to provide a safety device for such a vehicle seat as described above which is capable of activating the vibrator in response to operation of a parking brake of the vehicle and capable of deactivating the vibrator in response to release of the parking brake.

A further object of the present invention is to provide a safety device for such a vehicle seat as described above, having the above-mentioned characteristics, which is associated with a conventional electric warning device for the vehicle in a simple manner.

To accomplish the above objects, the present invention is directed to providing a safety device for a vehicle seat equipped with an electromagnetically operated vibrator in its back-rest arranged to be activated by energization of an electric control circuit for periodically supplying an electric current to the vibrator from an electric power source in the form of a vehicle battery. The safety device comprises switch means arranged between the electric control circuit and the electric power source to be opened under an inoperative condition of a parking brake of the vehicle and to be closed in response to operation of the parking brake, and means for energizing the electric control circuit in response to closing of the switch means to activate the vibrator during arrest of the vehicle and for deenergizing the electric control circuit in response to opening of the switch means to deactivate the vibrator during travel of the vehicle.

In the actual practice of the present invention, the safety device may comprise a first switch arranged between the electric control circuit and the electric power source to be opened under the inoperative condition of a parking brake of the vehicle and to be closed in response to operation of the parking brake. A second switch is arranged between the electric control circuit and the electric power source to be opened during operation of a power transmission of the vehicle and to be closed only when the power transmission is placed in its neutral position. A device energizes the electric control circuit in response to closing of both the first and second switch in order to activate the vibrator when the vehicle is stopped and to deenergize the electric control circuit in response to opening of the first switch and/or the second switch in order to deactivate the vibrator during movement of the vehicle.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 illustrates a safety device according to the present invention associated with a conventional warning circuit for a vehicle;

FIG. 4 illustrates a modification of the safety device of FIG. 3.

DESCRIPTION OF THE PREFERRED EMBODIMENTS

Figure 1:
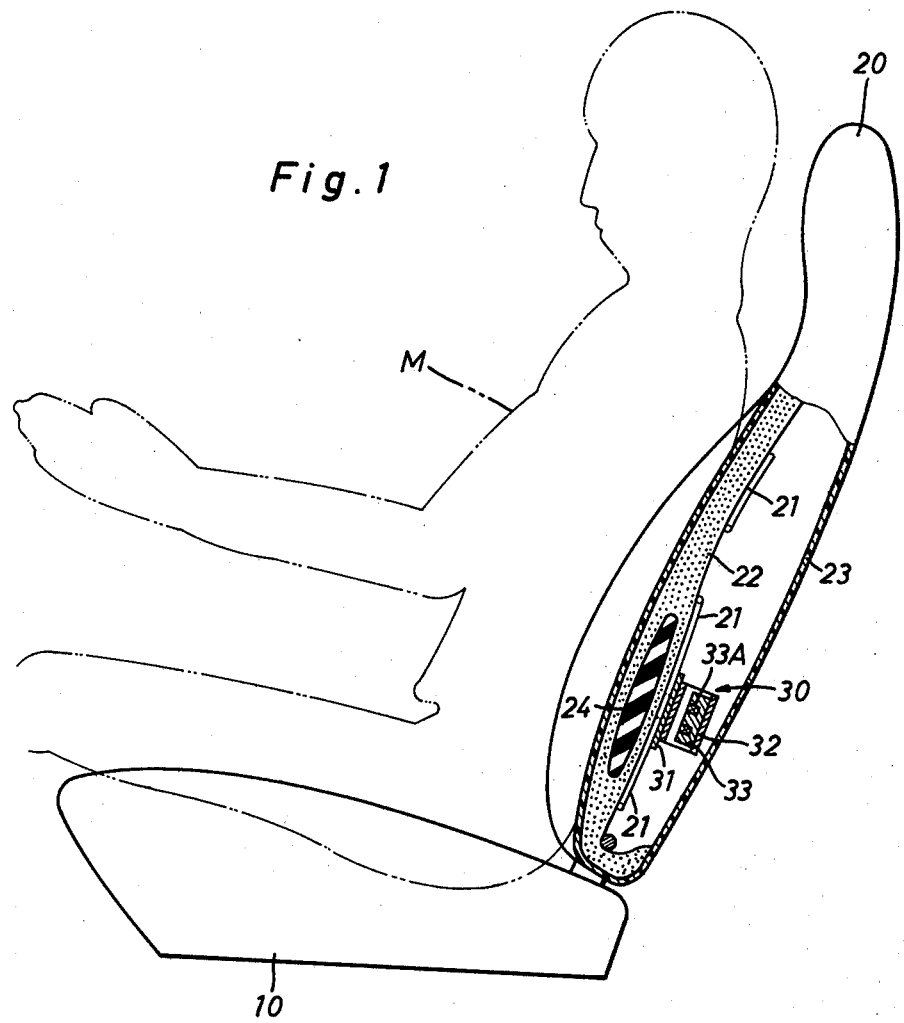
FIG. 1 is a fragmentary sectional view of a vehicle seat equipped in its back-rest with an electromagnetically operated vibrator assembly.

Referring now to the drawings, FIG. 1 illustrates a vehicle driver's seat composed of a cushion seat 10 and a back-rest 20 which is equipped therein with an electromagnetically operated vibrator assembly 30. The back-rest 20 includes a plurality of wire springs 21 in the form of a wave-shaped confriguation assembled with an outer seat-frame (not shown), a back-rest member 22 of such an elastic material as urethane foamed cushioning supported by the wire springs 21, an outer surface layer 23 such as a synthetic leather encompassing therein the outer seat-frame, wire springs 21, and back-rest member 22. Embedded within the back-rest member 22 is a vibratory plate member 24 of hard plastic foamed material, hard felt or hard synthetic rubber which is located adjacent the lumbar portion of an operator on the seat. The vibrator assembly 30 is arranged within a rear space between the back-rest member 22 and outer surface layer 23 and is fixedly assembled with the back-face of member 22 adjacent the lumbar portion.

Figure 2:
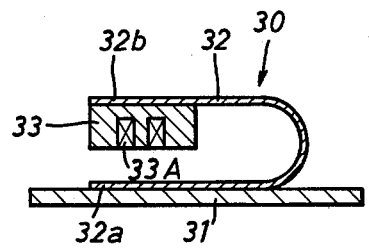
FIG. 2 is a view of a cross-section of the vibrator assembly shown in FIG. 1.

As shown in FIGS. 1 and 2, the vibrator assembly 30 comprises a base plate 31 of iron fixedly assembled to the back-face of member 22 through wire spring 21, a U-shaped leaf spring 32 fixed at its base end to plate 31, and an electromagnet 33 fixed to the movable end 32b of leaf spring 32. In this vibrator assembly 30, the elctromagnet 33 is attracted toward and moved away from the base plate 31 by periodic electric current supply to its electromagnetic coil 33A from an electric power source in the form of a vehicle battery 60 under the control of an electric control circuit 34 shown in FIG. 3, thereby to produce vibration in the lumbar portion of back-rest 20 of the seat.

In FIG. 3, there is illustrated a safety device 50 in accordance with the present invention which is associated with a conventional electric warning circuit 40 for the vehicle. The electric warning circuit 40 includes a brake warning lamp 42 connected in series with a normally open parking brake switch 41 which is arranged to be closed in operation of a parking brake 70, the parking brake switch 41 being connected in parallel with a series circuit 45 which includes a resistor 43 and a normally open warning switch 44 connected in series with each other. The brake warning switch 44 is arranged to be closed when the level of fluid in a reservoir for a brake master cylinder drops below a predetermined minimum level.

The safety device 50 includes a voltage divider 53 composed of resistors 51 and 52 connected in a series with each other, and a comparator 54 arranged to produce an output signal therefrom for energizing the electric control circuit 34 for vibrator assembly 30. The voltage divider 53 is connected to the vehicle battery 60 to produce a reference output voltage V $R_2/(R_1+R_2)$ lower than a voltage drop IR appearing at the series circuit 45 when the brake warning switch 44 is closed to render the series circuit 45 conductive. In the above-formula, I is a value of current across the series circuit 45, V is the power source voltage, and $R_1$, $R_2$ are respective resistance values of resistors 51 and 52. With the arrangement, the comparator 54 is applied at its positive input terminal with the reference output voltage V $R_2/(R_1+R_2)$ and at its negative input terminal with the voltage at the series circuit 45. When the voltage IR at the series circuit 45 becomes lower than the reference output voltage in response to closing of the parking brake switch 41, the comparator 54 produces an output signal therefrom which is applied to energize the electric control circuit 34 thereby to activate the vibrator 30. When both the parking brake switch 41 and the brake warning switch 44 are opened, the voltage appearing at the series circuit 45 is maintained at the same level as the power source voltage V higher than the reference output voltage defined by the voltage divider 53.

During use of the driver's seat, when the operator operates the parking brake to close the parking brake switch 41, the comparator 54 produces an output signal therefrom in response to closing of the parking brake switch 41, and in turn, the control circuit 34 is energized by the output signal from comparator 54 to activate the vibrator 30. During energization of the control circuit 34, the electromagnetic coil 33A of vibrator assembly 30 is periodically supplied with an electric current from the power source under the control of the control circuit 34 to produce vibration of the vibratory plate member 24 in back-rest 20, and the vibration acts to the lumbar portion of the operator to eliminate fatigue of his lumbar. When the parking brake is maintained in its released position during travel of the vehicle, the parking brake switch 41 is opened so that the comparator 54 does not produce any output signal regardless of the opening and closing of the brake warning switch 44. As a result, the vibrator 30 is maintained in its deactivated condition to prevent napping of the operator during movement of the vehicle.

In FIG. 4, there is illustrated a modified safety device 70 for the driver's seat which includes an AND circuit 71 connected at its first input terminal 71a to the positive terminal 61a of the vehicle battery 60 by way of a normally open neutral switch 72 and at its second input terminal 71b to the output terminal of an inverter 74. AND circuit 71 is also connected at its output terminal 71c to the electric control circuit 34 for the vibrator assembly 30 described above. The neutral switch 72 is arranged to be closed when a power transmission of the vehicle is conditioned in its neutral position, and the inverter 74 is connected at its input terminal to the negative terminal 61b of the vehicle battery 60 by way of a normally open parking brake switch 73 which is arranged to be closed during operation of a parking brake of the vehicle.

During operation of the modified safety device 70, when the power transmission is conditioned in its neutral position and the parking brake is operated to stop or hold the vehicle, both the switches 72 and 73 are closed to apply the power source voltage to both the input terminals 71a, 71b of AND circuit 71. Thus, the electric control circuit 34 is energized in response to an output signal from AND circuit 71 to activate the vibrator 30 while the vehicle is parked. This causes vibration of the vibratory plate member 24 in the back-rest 20 which acts to the lumbar portion of the operator as described above. When the power transmission is operated to open the neutral switch 72 and/or the parking brake is in its released position to open the parking brake switch 73, AND circuit 71 does not produce any output signal to maintain the electric control circuit 34 in its deenergized condition. As a result, the vibrator 30 is maintained in its deactivated condition to prevent napping of the operator during travel of the vehicle. In the actual practice of the present invention, the parking brake switch 73 may be interposed between the positive terminal 61a of vehicle battery 60 and the second input terminal 71b of AND circuit 71 as shown by an imaginary line in FIG. 4.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A safety device for a vehicle seat for use in automotive vehicles assembled with a parking brake, said vehicle seat being equipped in its back-rest with an electromagnetically operated vibrator which is arranged to be activated by energization of an electric control circuit for periodically supplying an electric current to said vibrator from an electric power source, the safety device comprising:

switch means arranged between said electric control circuit and said electric power source and cooperating with said parking brake so as to be opened when said parking brake is released and to be closed in response to activation of said parking brake; and means for energizing said electric control circuit in response to closing of said switch means to activate said vibrator when the vehicle is in a parked condition and for deenergizing said electric control circuit in response to opening of said switch means to deactivate said vibrator.

2. A safety device for a vehicle seat as set forth in claim 1, wherein said switch means is associated with an electric warning circuit for the vehicle which comprises a brake warning lamp connected in series with said switch means, and a series circuit including a resistor and a normally open brake warning switch connected in series with each other, said series circuit being connected in parallel with said switch means, and said brake warning switch being arranged to be closed when the level of fluid in a reservoir for a brake master cylinder drops below a predetermined minimum level, and wherein said means for energizing said electric control circuit comprises a voltage divider connected to said electric power source for producing a reference output voltage, and a comparator for comparing the reference output voltage with a voltage appearing at said series circuit to produce an output signal therefrom when the voltage at said series circuit is lower than the reference output voltage, whereby said electric control circuit is energized in response to the output signal from said comparator to activate said vibrator.

3. A safety device for a vehicle seat for use in automotive vehicles assembled with a parking brake, said vehicle seat being equipped in its back-rest with an electromagnetically operated vibrator which is arranged to be activated by energization of an electric control circuit for periodically supplying an electric current to said vibrator from an electric power source in the form of a vehicle battery, the safety device comprising:

first switch means arranged between said electric control circuit and said electric power source and cooperating with said parking brake so as to be opened when said parking brake is released and to be closed in response to activation of said parking brake;

second switch means arranged between said electric control circuit and said electric power source and cooperating with a power transmission of the vehicle so as to be opened during operation of said power transmission and to be closed only when said power transmission is conditioned in its neutral position; and means for energizing said electric control circuit in response to closing of both said first and second switch means to activate said vibrator and for deenergizing said electric control circuit in response to opening of said first switch means and/or said second switch means to deactivate said vibrator, whereby said vibrator is activated only when the vehicle is in its parked condition.

4. A safety device for a vehicle seat as set forth in claim 3, wherein said means for energizing said electric control circuit comprises an AND circuit connected at its first input terminal to the positive terminal of said electric power source by way of said second switch means and at its second input terminal to the output terminal of an inverter whose input terminal is connected to the negative terminal of said electric power source by way of said first switch means, said AND circuit being connected at its output terminal to said electric control circuit.

5. A safety device for a vehicle seat as set forth in claim 3, wherein said means for energizing said electric control circuit comprises an AND circuit connected at its first and second input terminals to the positive terminal of said electric power source respectively by way of said first and second switch means.

* * * * *